(No Model.)
J. S. MOODY.
FEEDING TROUGH.
No. 313,227. Patented Mar. 3, 1885.
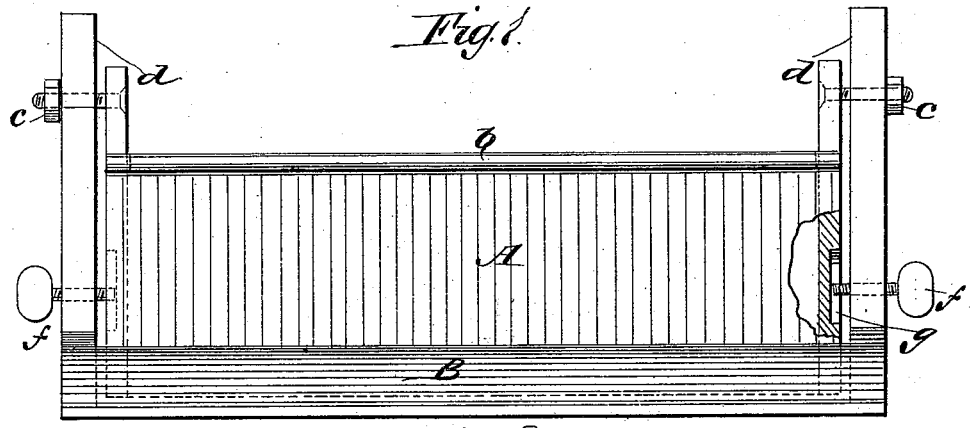
Fig. 1.
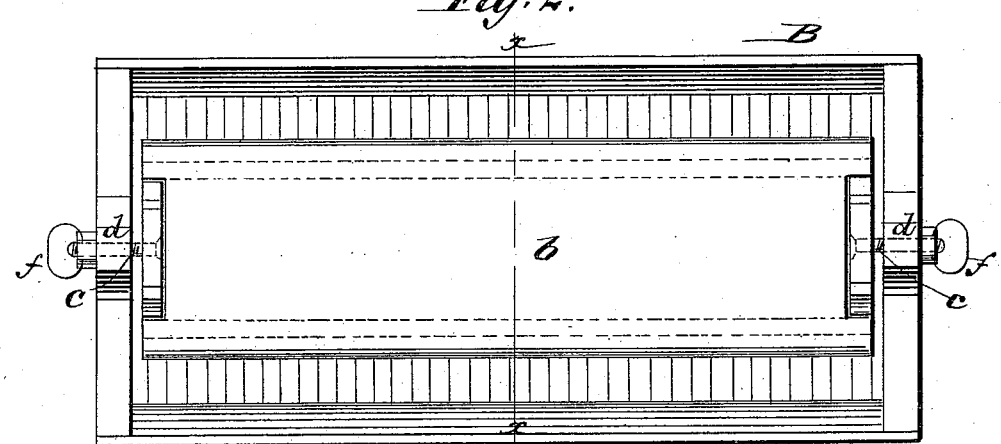
Fig. 2.
Fig. 3.
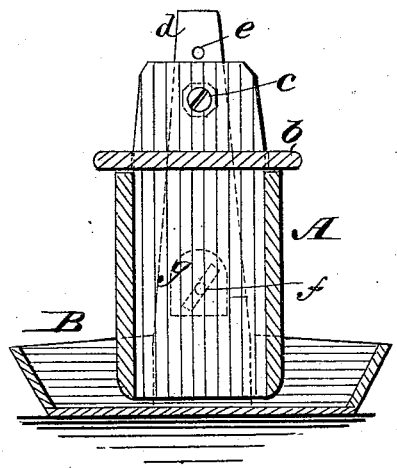
WITNESSES:
F. McArdle.
C. Sedgwick
INVENTOR:
J. S. Moody
BY
ATTORNEYS.

UNITED STATES PATENT OFFICE.

JAMES SHAW MOODY, OF FILLMORE, ILLINOIS.

FEEDING-TROUGH.

SPECIFICATION forming part of Letters Patent No. 313,227, dated March 3, 1885.

Application filed August 30, 1884. (No model.)

*To all whom it may concern:*

Be it known that I, JAMES S. MOODY, of Fillmore, in the county of Montgomery and State of Illinois, have invented certain new and useful Improvements in Feeding-Troughs, of which the following is a full, clear, and exact description.

This invention relates to feeding-troughs generally, including troughs for feeding hogs, sheep, and other stock or cattle, and also poultry. The size and proportions of the entire structure will vary with the particular kind of stock it is designed for and with the number of stock to be fed from it at the same time, and it may either be mounted on legs or rest on the ground.

The invention mainly consists in a swinging hopper made with an open bottom, or having one or more openings therein, and a shallow pan or trough proper arranged below said hopper at a sufficient distance therefrom to allow of the feed passing out in limited quantities from the hopper into the trough as the stock by pushing on the hopper cause it to swing.

It also consists in an adjustable construction of the structure, to regulate the amount of discharge from the hopper or to vary it according to the nature of the feed, and in means for limiting the swing of the hopper.

A feeding-trough constructed in accordance with my invention will enable the stock by their own effort to get just as much feed as they will eat clean, and no more. In this way it not only economizes the feed, but keeps the same clean, thereby adding to the health of the stock.

Reference is to be had to the accompanying drawings, forming part of this specification, in which similar letters of reference indicate corresponding parts in all the figures.

Figure 1 represents a partly-broken side view of a feeding-trough embodying my invention; Fig. 2, a plan of the same, and Fig. 3 a transverse section on the line $xx$ in Fig. 2.

A is an open-bottomed box or hopper, fitted with a lid, $b$, and arranged to swing on or by upper pivots, $c\ c$, in uprights $d\ d$ at each end of the hopper, and projecting upward from a trough or pan, B, arranged beneath the hopper, so as to receive the hopper down within it to a limited distance from the upper surface of the bottom of the trough, to provide for a certain discharge of feed from the hopper into the trough. Said trough B is of greater width than the hopper A, or lower portion thereof, to allow of the swinging of the hopper in the trough.

The feed being placed in the hopper A and the latter being closed by the lid $b$, a certain amount of feed will pass out of the hopper into the trough, and by the stock nosing or pushing on the swinging hopper the discharge into the trough will be quickened; but while the stock will have free access to the feed in the trough, they cannot foul or waste it, and will only be able to extract or work out as much feed from the hopper as they will eat clean, wasting none.

Different kinds of feed will require a different-sized discharge opening or space between the hopper and trough, and to this end I provide for raising or lowering the one of these devices relatively to the other. This may be done by making the pivots $c\ c$ removable and providing the uprights $d$ with two or more apertures, $e$, one above the other, for entering the pivots through any of them.

To limit the swing of the hopper in the trough to what is only necessary or desirable, I pass through either or both uprights $d$ a pin or screw-stop, $f$, the inner end of which enters a recess, $g$, in or projects between projections on either end of the hopper.

The whole structure may be put up cheaply, mainly of rough lumber, and be rapidly transported from place to place as required for use.

Having thus described my invention, I claim as new and desire to secure by Letters Patent—

1. The combination, with a trough, of an open-bottomed box or hopper extending within the trough and hung to swing therein, substantially as set forth.

2. The combination, with the trough B, of the pendent open-bottomed hopper A, carried by upper end pivots, $c$, connected with the trough, and adjustable up or down in uprights $d$, to vary the distance apart of the bottom of the hopper with the upper surface of the bottom of the trough within which the hopper swings, essentially as and for the purposes described.

3. The combination of one or more stop-pins, $f$, with the swinging open-bottomed hopper A and the trough B, substantially as specified.

JAMES SHAW MOODY.

Witnesses:
IRA E. LANE,
JONATHAN SHORT.